(12) United States Patent
Hwang

(10) Patent No.: US 11,472,129 B2
(45) Date of Patent: Oct. 18, 2022

(54) CAP AND METHOD FOR FORMING THE SAME

(71) Applicant: Ya-Chang Hwang, Pingtung County (TW)

(72) Inventor: Ya-Chang Hwang, Pingtung County (TW)

(*) Notice: Subject to any disclaimer, the term of this patent is extended or adjusted under 35 U.S.C. 154(b) by 0 days.

(21) Appl. No.: 17/347,889

(22) Filed: Jun. 15, 2021

(65) Prior Publication Data

US 2022/0184896 A1 Jun. 16, 2022

Related U.S. Application Data

(63) Continuation-in-part of application No. 17/140,432, filed on Jan. 4, 2021.

(30) Foreign Application Priority Data

Dec. 14, 2020 (CN) .......................... 202011466620.6

(51) Int. Cl.
*B29C 65/00* (2006.01)
*A42C 1/04* (2006.01)
(Continued)

(52) U.S. Cl.
CPC .......... *B29C 66/729* (2013.01); *A42B 1/0182* (2021.01); *A42C 1/02* (2013.01);
(Continued)

(58) Field of Classification Search
CPC ......... A42B 1/02; A42B 1/0182; A42B 1/002; A42B 1/019; A42C 1/00; A42C 1/04;
(Continued)

(56) References Cited

U.S. PATENT DOCUMENTS 5,556,696 A * 9/1996 Pinkus ................... D03D 15/00
  2/209.12
8,613,114 B1 * 12/2013 Olivares Velasco ........................
  A41D 31/065
  2/171.1

(Continued)

FOREIGN PATENT DOCUMENTS

JP 6025611 B2 11/2016

OTHER PUBLICATIONS

Search Report Issued by International Patent Office for Application No. 21179754.3-1017 dated Jun. 12, 2021.

*Primary Examiner* — Philip C Tucker
*Assistant Examiner* — Brian R Slawski
(74) *Attorney, Agent, or Firm* — Rosenberg, Klein & Lee

(57) ABSTRACT

A cap and a method for forming the same are provided. An integrally formed outer layer of fabric and an integrally formed moldable layer are adhesively bonded together to form a moldable panel. A curved edge of the moldable panel is then formed by a mold. After that, the moldable panel and at least one second panel are connected to form a crown, to which a peak is subsequently connected to form the cap. Once the curved edge of the moldable panel is formed by heating and pressure application through the mold, the integrally formed moldable layer keeps the moldable panel in shape, so there is no need to support the outer layer of fabric and curve, for example, the front panel with two pieces of buckram that are stitched together, as is conventionally required.

5 Claims, 11 Drawing Sheets

(51) Int. Cl.
  *B29C 65/48* (2006.01)
  *B29C 65/70* (2006.01)
  *A42B 1/0182* (2021.01)
  *A42C 1/02* (2006.01)
  *B29L 31/48* (2006.01)
  *A42B 1/02* (2006.01)

(52) U.S. Cl.
  CPC ............... *A42C 1/04* (2013.01); *B29C 65/48* (2013.01); *B29C 65/70* (2013.01); *B29C 66/71* (2013.01); *A42B 1/02* (2013.01); *B29C 66/301* (2013.01); *B29L 2031/4814* (2013.01)

(58) Field of Classification Search
  CPC . B29L 2031/4814; B29C 65/48; B29C 65/62; B29C 65/70; B29C 65/72; B29C 66/729; B29C 66/71; B29C 66/712; B29C 66/301; B29C 70/00; B29C 70/04; B29C 70/28; B29C 65/02; B29C 65/18; B29C 65/4815
  USPC ............ 156/60, 63, 93, 196, 212, 213, 224; 2/171, 175.1, 175.2, 195.1, 195.2, 195.5
  See application file for complete search history.

(56) References Cited

U.S. PATENT DOCUMENTS

| | | | |
|---|---|---|---|
| 10,765,162 B2 | 9/2020 | Mao | |
| 2004/0221368 A1* | 11/2004 | Okot | A42C 1/00 2/171 |
| 2006/0112475 A1* | 6/2006 | Wang | A42B 1/02 2/195.5 |
| 2007/0143906 A1* | 6/2007 | Renteria | A42B 1/0184 2/195.1 |
| 2011/0061144 A1* | 3/2011 | Chen | A42B 1/0182 2/195.1 |
| 2015/0096104 A1* | 4/2015 | Kim | A42C 1/04 2/195.5 |
| 2017/0265552 A1* | 9/2017 | Lau | A42C 1/00 |
| 2018/0184748 A1* | 7/2018 | Chan | A42B 1/002 |
| 2019/0045876 A1* | 2/2019 | Koh | A42C 1/08 |
| 2019/0166941 A1* | 6/2019 | Mao | A42B 1/22 |

* cited by examiner

CAP AND METHOD FOR FORMING THE SAME

CROSS REFERENCE TO RELATED APPLICATIONS

This application is a continuation-in-part of U.S. patent application Ser. No. 17/140,432, filed on Jan. 4, 2021. This application also claims priority under 35 U.S.C. § 119(a) to Chinese Patent Application Ser. No. 202011466620.6, filed on Dec. 14, 2020.

FIELD OF THE INVENTION

The present invention relates to a cap and a method for forming the same. More particularly, the invention relates to a cap in which a moldable panel of the crown has a curved edge formed by a mold, and in which an integrally formed moldable layer is used to support, and maintain the shape of, an integrally formed outer layer of fabric so that there is no need to support the outer layer of fabric and form a curved panel by way of multiple pieces of buckram that are stitched together, as is conventionally required.

BACKGROUND OF THE INVENTION

Referring to FIG. 8, a conventional baseball cap is typically made by connecting, or stitching, six panels A together to form a crown and then bonding a peak B connected to the crown. About 80% of the baseball caps on the market are made in this way. In order for the front part of the crown of a baseball cap to be curved and upstanding, the panels A are generally so arranged that the joint A1 of two of the panels A is located at the front part of the crown, the objective being to take advantage of the angle of the joint A1 of the two panels A and thereby render the front part of the crown curved and upstanding. However, as the panels A forming the joint A1 must be folded back and connected together by stitching and bonding with a strip of bonding tape, and an additional layer of lining may have to be bonded adhesively to the two panels A to keep the crown in shape, the joint A1 tends to be so thick and uneven that when a decoration is subsequently made on the front part of the crown by embroidering or other methods, the needle or thread used for embroidering may break or the decoration made by other methods may become defective in various ways, resulting in a high fraction defective.

To solve the problem stated above, referring to FIG. 9, another baseball cap configuration includes a single panel C at the front of the crown so that a decoration made by embroidering or other methods can be formed chiefly on the single panel C without crossing the joints C1 of the panel C, thereby preventing the needle or thread used for embroidering from breaking. However, as the single panel C provides too small an area where a decoration can be made by embroidering or other methods, a relatively large decoration will still cross the joints C1, making this configuration unsuitable for most decorations. Moreover, the two stitched joints C1 at the front are not visually pleasing, and the relatively flat front panel C fails to lend the desired curvature and erectness to the front part of the crown and thus compromises the look of the baseball cap.

FIG. 10 shows another baseball cap configuration that includes a single panel D at the front of the crown. The single panel D, however, is larger than the single panel C in order to provide an area large enough to make a decoration on the panel D by embroidering or other methods. The relatively large panel D requires a stitched joint D1 to be formed by cutting the panel D at the top and then stitching the cut closed so as to form a curved edge to facilitate joining with the panels E at the back of the crown.

U.S. patent Ser. No. 10/765,162 discloses "Cap and method for manufacturing a cap", in which the crown of the cap is not composed of a plurality of panels stitched together but is integrally formed by a single sheet of fabric. To make the front part of the crown curved and upstanding, referring to FIG. 7 and FIG. 8 accompanying the specification of the aforesaid patent, an inner layer of buckram is adhesively bonded to the outer layer of fabric of the crown. As buckram exhibits relatively poor stretchability and low moldability, it is required that the layer of buckram be made by stitching at least two pieces of buckram together in a curved manner and be adhesively bonded to the inner side of the outer layer of fabric. This manufacturing method, therefore, entails a lot of steps, including molding the outer layer of fabric at a suitable temperature and pressure, stitching at least two pieces of buckram together, and bonding the resulting layer of stitched buckram adhesively to the inner side of the molded outer layer of fabric. Consequently, product defects may arise if the different pieces of buckram are not precisely stitched together or if the layer of buckram is not properly aligned with the outer layer of fabric when adhesively bonded thereto. The joint(s) of the buckram may also lead to embroidery defects when the front part of the crown is embroidered. Furthermore, the outer layer of fabric in the aforesaid patent must be a stretchable fabric, meaning not every fabric is suitable for use, and this makes it difficult to choose a fabric that meets practical needs.

SUMMARY OF THE INVENTION

To overcome the drawbacks of the prior art, the present invention provides a method for forming a cap, and the method is carried out as follows:

An integrally formed outer layer of fabric and an integrally formed moldable layer are adhesively bonded to form a moldable panel. The moldable panel is then formed with a curved edge by a mold. After that, the moldable panel and at least one second panel are connected to form a crown, and a peak is connected to the crown to form a cap.

The present invention further provides a cap that includes a crown and a peak.

The crown has a moldable panel and at least one second panel connected to the moldable panel. The moldable panel has an integrally formed outer layer of fabric and an integrally formed moldable layer adhesively bonded to the outer layer of fabric. Also, the moldable panel is formed with a curved edge by a mold. The peak is connected to the crown.

Furthermore, the moldable panel has a layer of buckram adhesively bonded to the moldable layer.

Furthermore, the moldable layer is made of wool, and the mold works at a molding temperature between 165° C. and 195° C.

Furthermore, the moldable layer is made of an ethylene-vinyl acetate (EVA) material, and the mold works at a molding temperature between 185° C. and 215° C.

Furthermore, the moldable layer is made of polypropylene (PP), and the mold works at a molding temperature between 100° C. and 120° C.

Furthermore, the moldable panel is a front panel, and the at least one second panel is four side panels.

Furthermore, the outer layer of fabric of the moldable panel is integrally formed with the at least one second panel.

Furthermore, the outer layer of fabric of the moldable panel is integrally formed with the at least one second panel, and the integrally formed moldable layer is adhesively bonded to the at least one second panel, too.

The technical features described above can produce the following effects:
1. Once the curved edge of the moldable panel of the crown in the present invention is formed by the mold, the integrally formed outer layer of fabric is supported, and has its shape maintained, by the integrally formed moldable layer. There is no need to support the outer layer of fabric with multiple pieces of buckram that are stitched together, as is required in the prior art.
2. Each of the outer layer of fabric, the moldable layer, and the layer of buckram in the present invention is integrally formed, so no joint exists in the outer layer of fabric, the inner moldable layer, or the layer of buckram. Thus, the quality of decorations made on the cap by embroidery or other methods will not be affected by the joining of panels as required in the prior art.
3. The moldable panel in the present invention is made by bonding the outer layer of fabric and the moldable layer together adhesively and molding the adhesively bonded assembly in a single molding (i.e., heating and pressure application) process. As a result, the multiple processing steps of the prior art are reduced, and imprecise fabric connection and misalignment between adhesively bonded fabrics are avoided to lower the fraction defective and reduce defective products.
4. The outer layer of fabric of the crown in the present invention is not subject to limitations in material and can be made of whichever material chosen to meet product requirements.

DETAILED DESCRIPTION OF THE INVENTION

The technical features described above are incorporated into the cap of the present invention and a method for forming the same. The major effects of the cap and of the forming method are demonstrated by the following embodiment.

Figure 1:
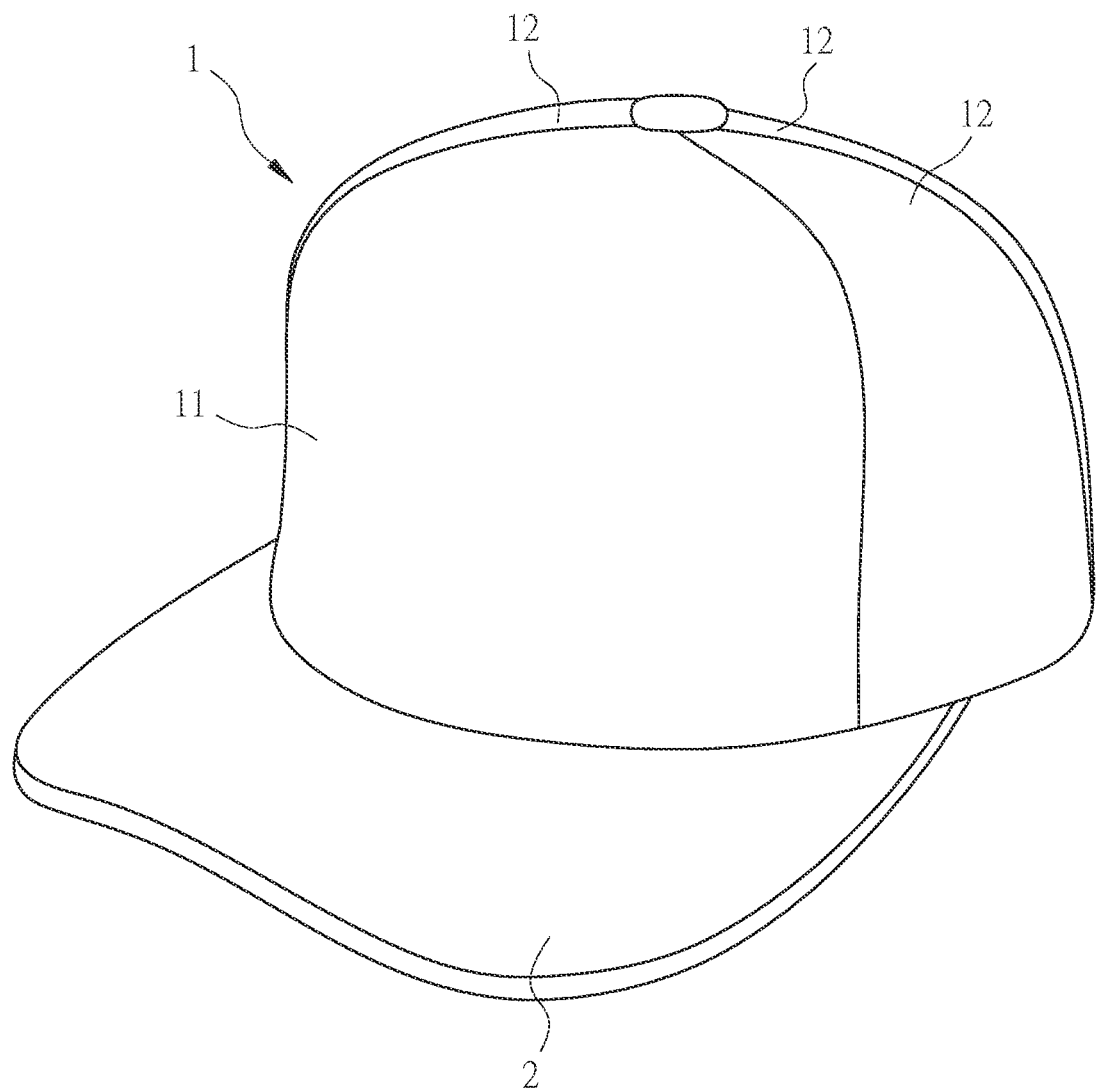
FIG. 1 is a perspective view of the cap according to an embodiment of the present invention.
Figure 2:
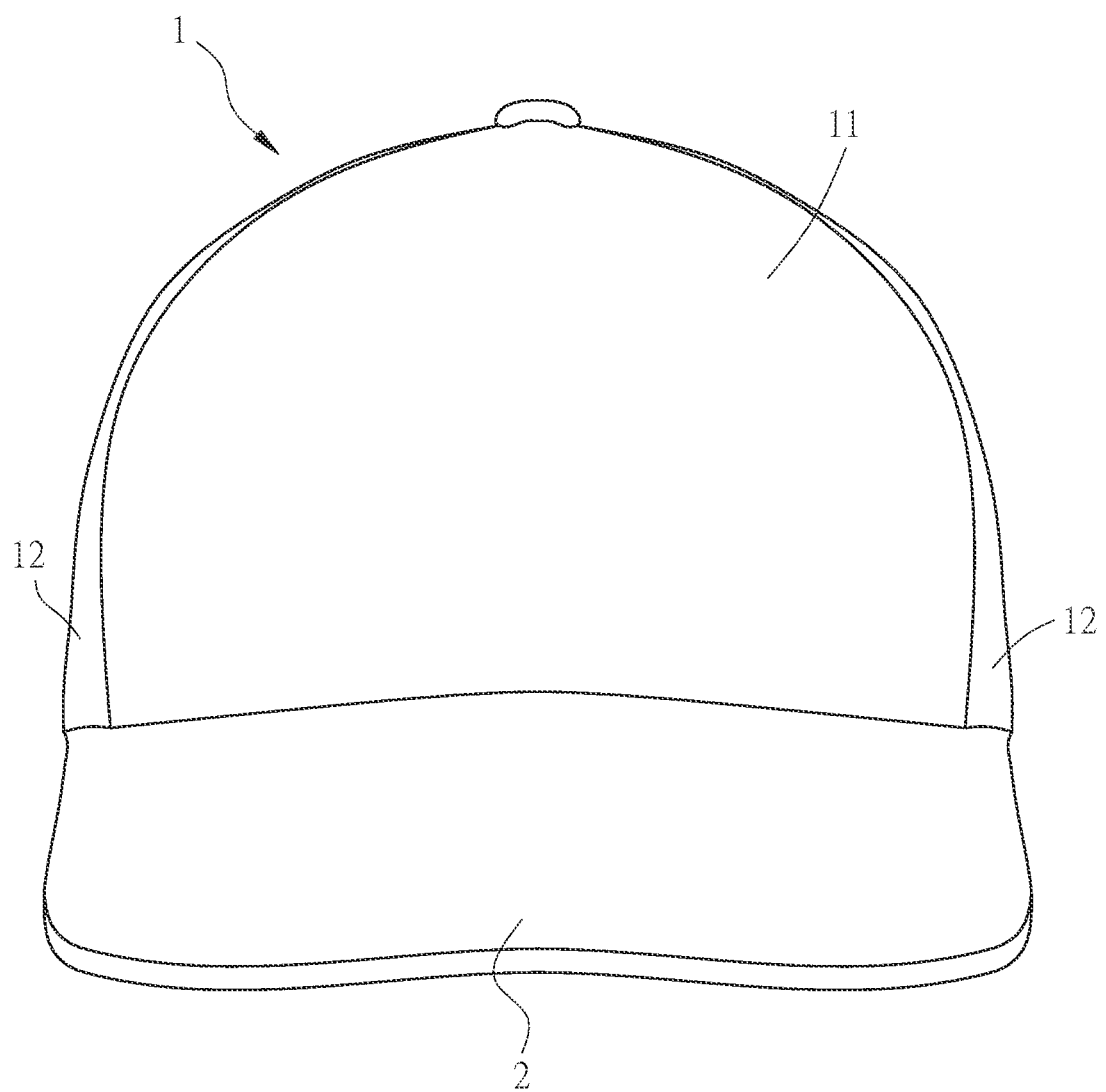
FIG. 2 is a front view of the cap in FIG. 1.
Figure 3:
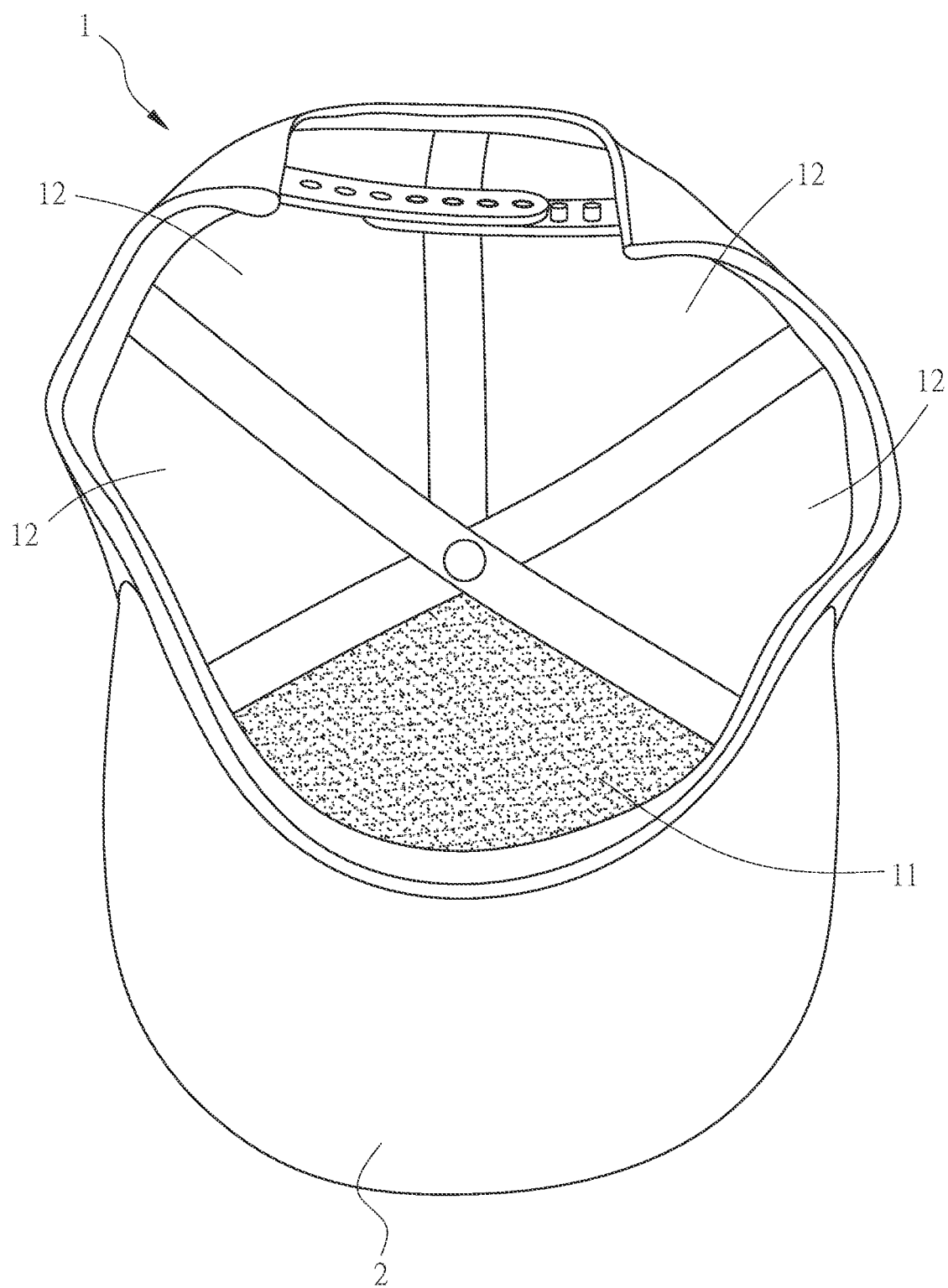
FIG. 3 is a bottom view of the cap in FIG. 1, showing that the cap includes four side panels.

Referring to FIG. 1 to FIG. 3, the cap according to an embodiment of the present invention includes a crown 1 and a peak 2.

Figure 4:
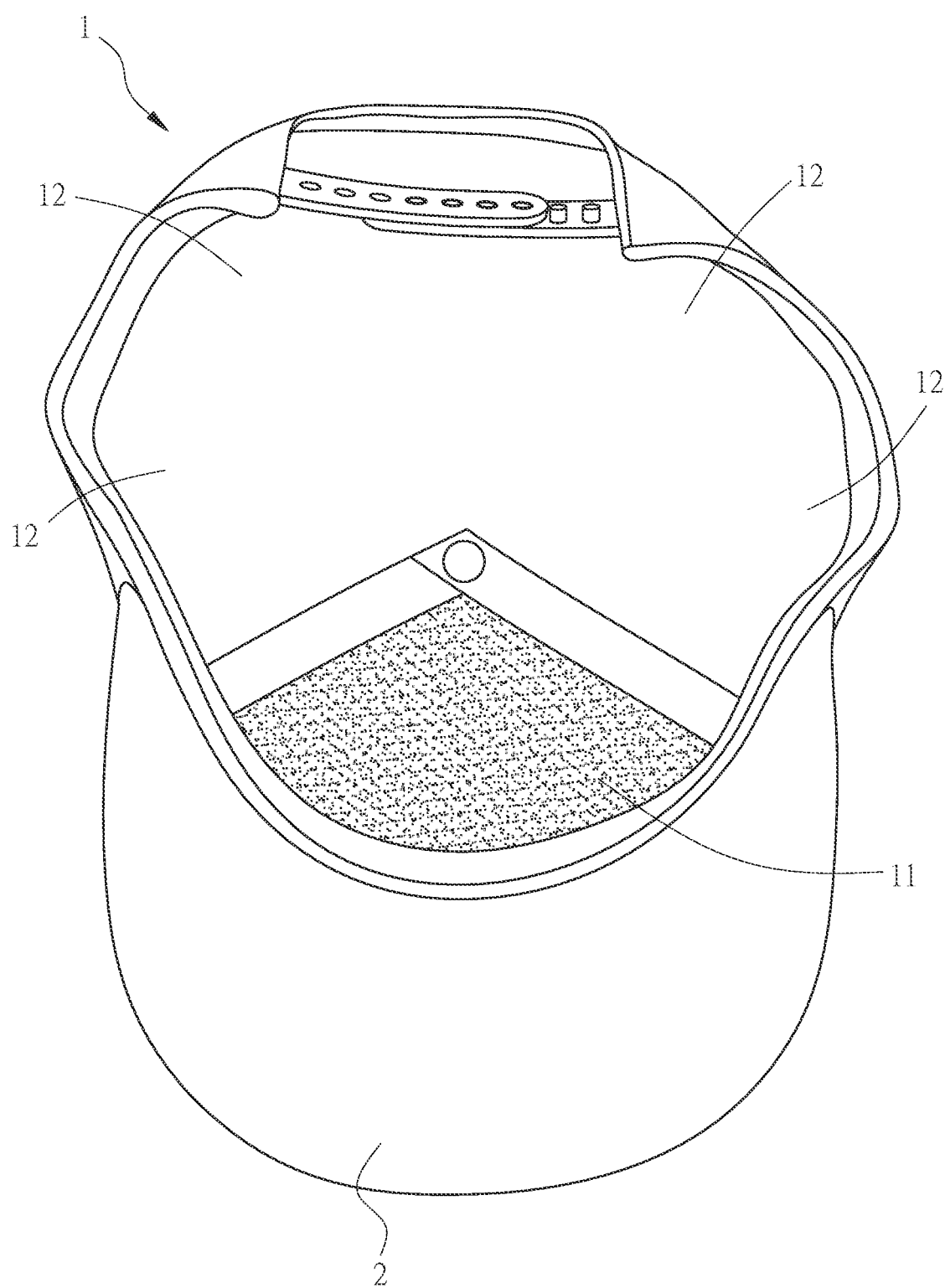
FIG. 4 is a bottom view of the cap according to another embodiment of the invention, in which the cap includes a single side panel.

The crown 1 has a front panel 11 and a plurality of side panels 12, wherein all the panels 11 and 12 are connected together. In this embodiment, the front panel 11 and the four side panels 12 are connected to form the crown 1. If a different manufacturing method is used, there may be only one side panel 12 as shown in FIG. 4, and in that case, the single front panel 11 and the single side panel 12 are connected to form the crown 1. The peak 2 is subsequently connected to the front panel 11 of the crown 1.

Figure 5:
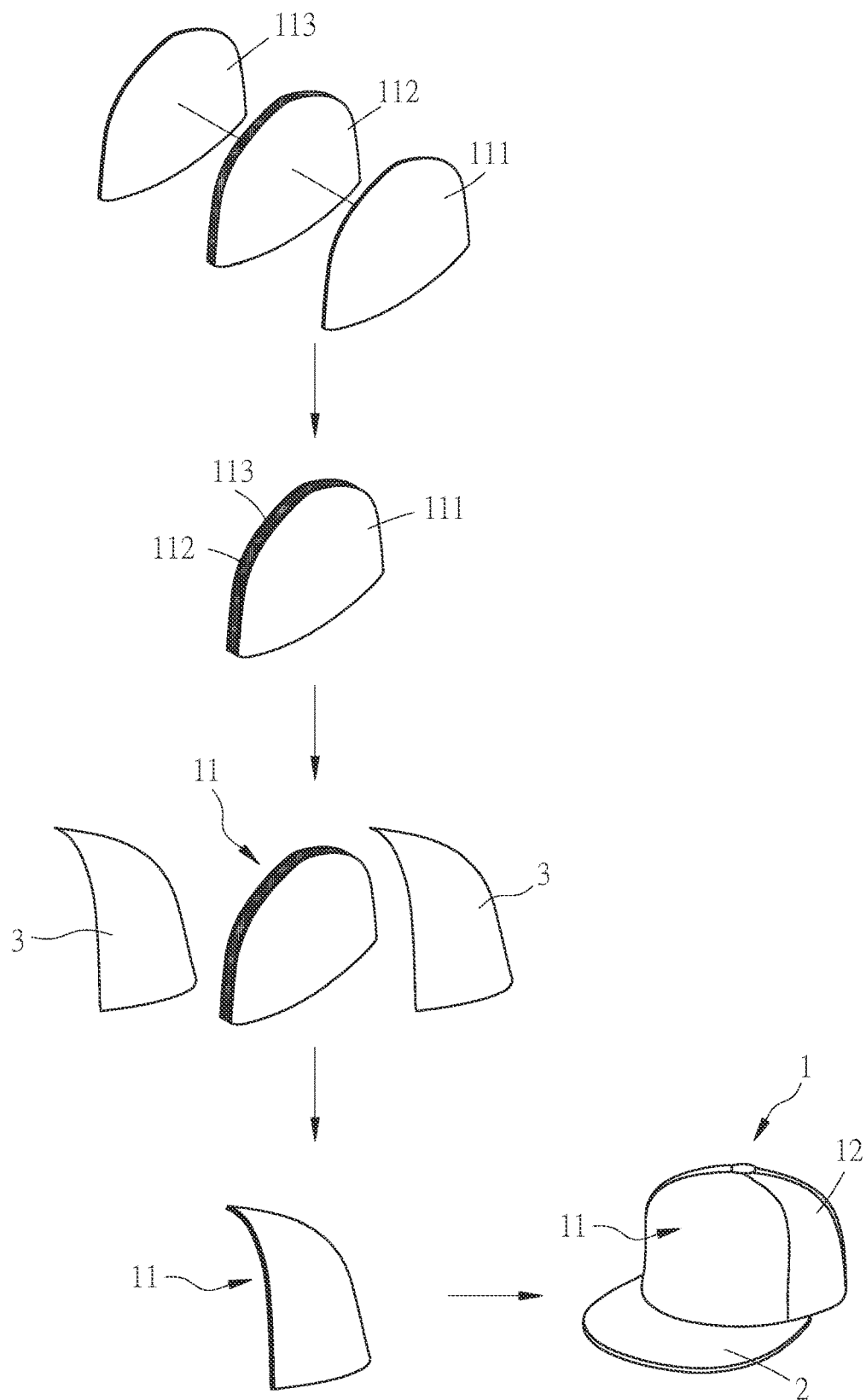
FIG. 5 is the flowchart of the method of the present invention for forming a cap.
Figure 6:
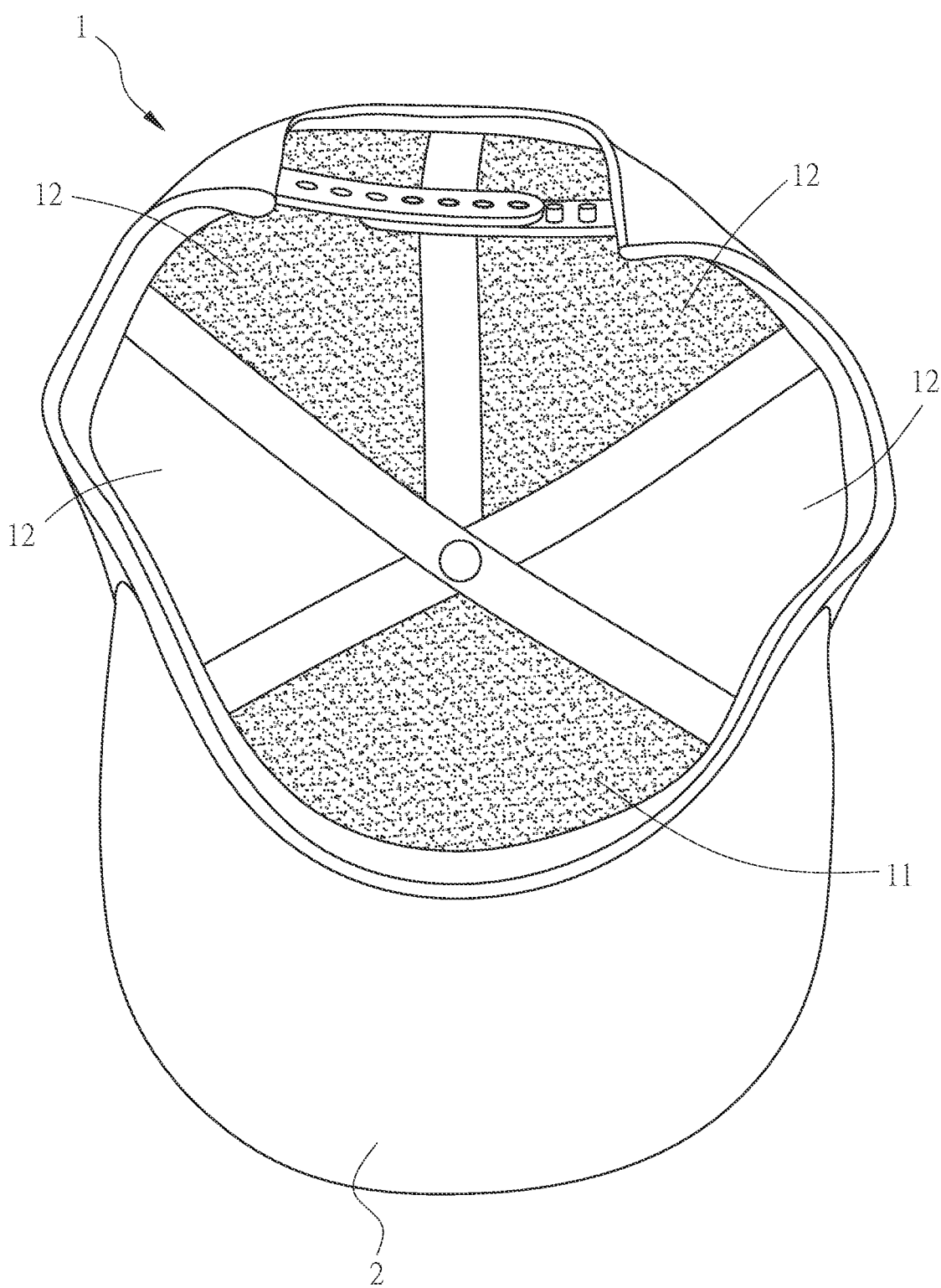
FIG. 6 is a bottom view of the cap according to yet another embodiment of the invention, in which the front panel and some of the side panels are each provided with a moldable layer.
Figure 6A:
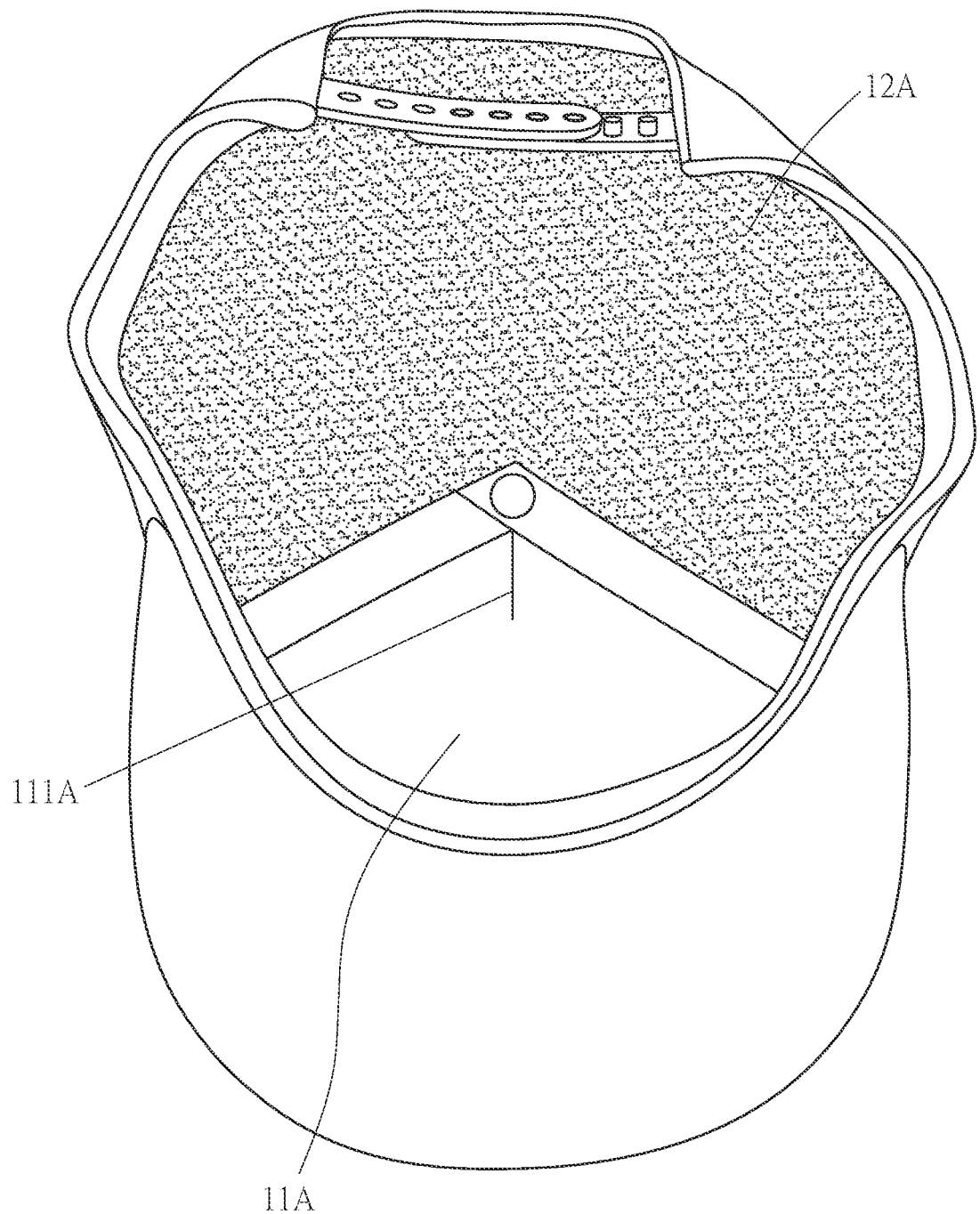
FIG. 6A is a bottom view of the cap according to still another embodiment of the invention, in which the cap includes a single side panel and the side panel is provided with a moldable layer.
Figure 7:
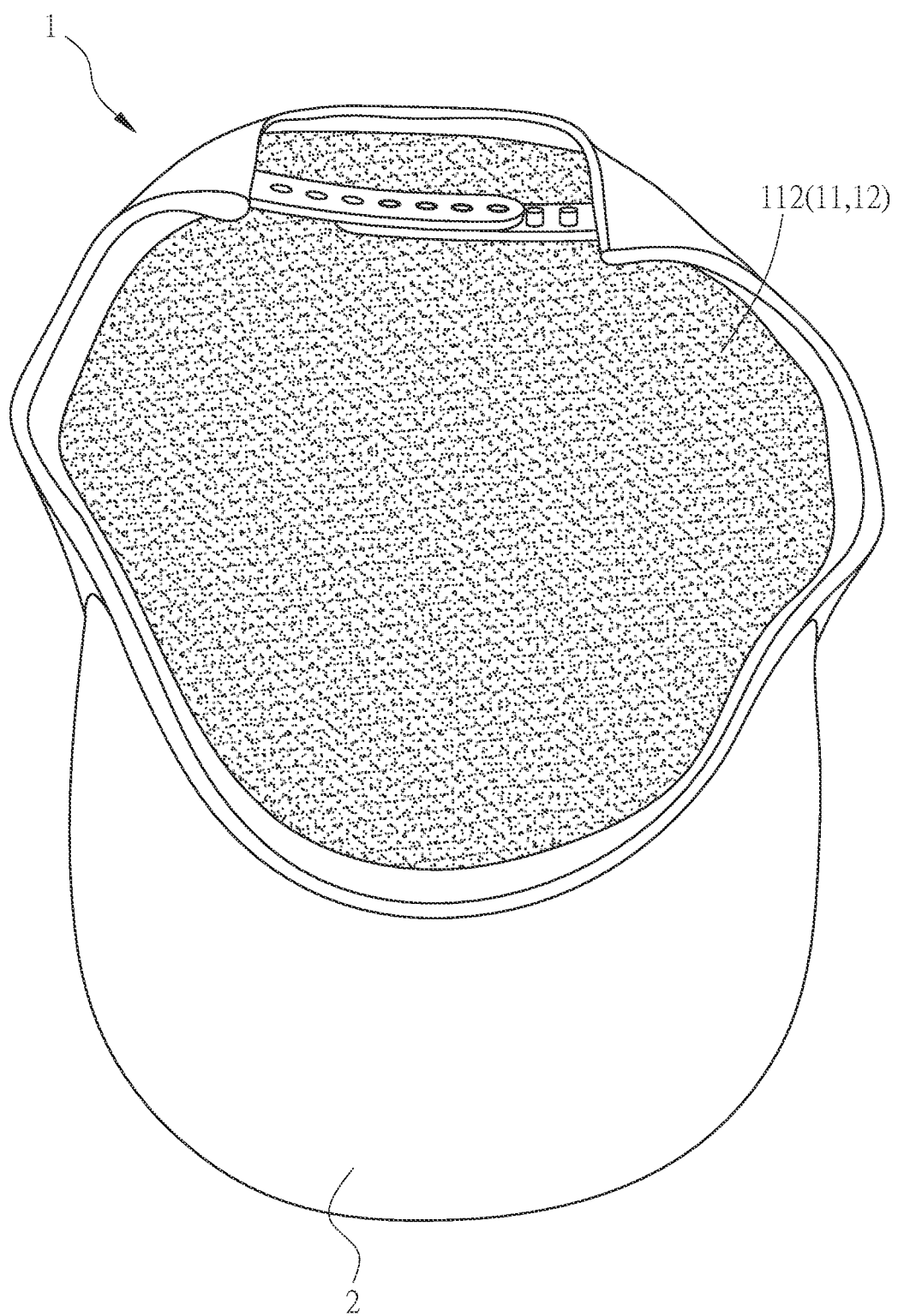
FIG. 7 is a bottom view of the cap according to a further embodiment of the invention, in which the front panel and all the side panels are provided with a moldable layer.
Figure 8:
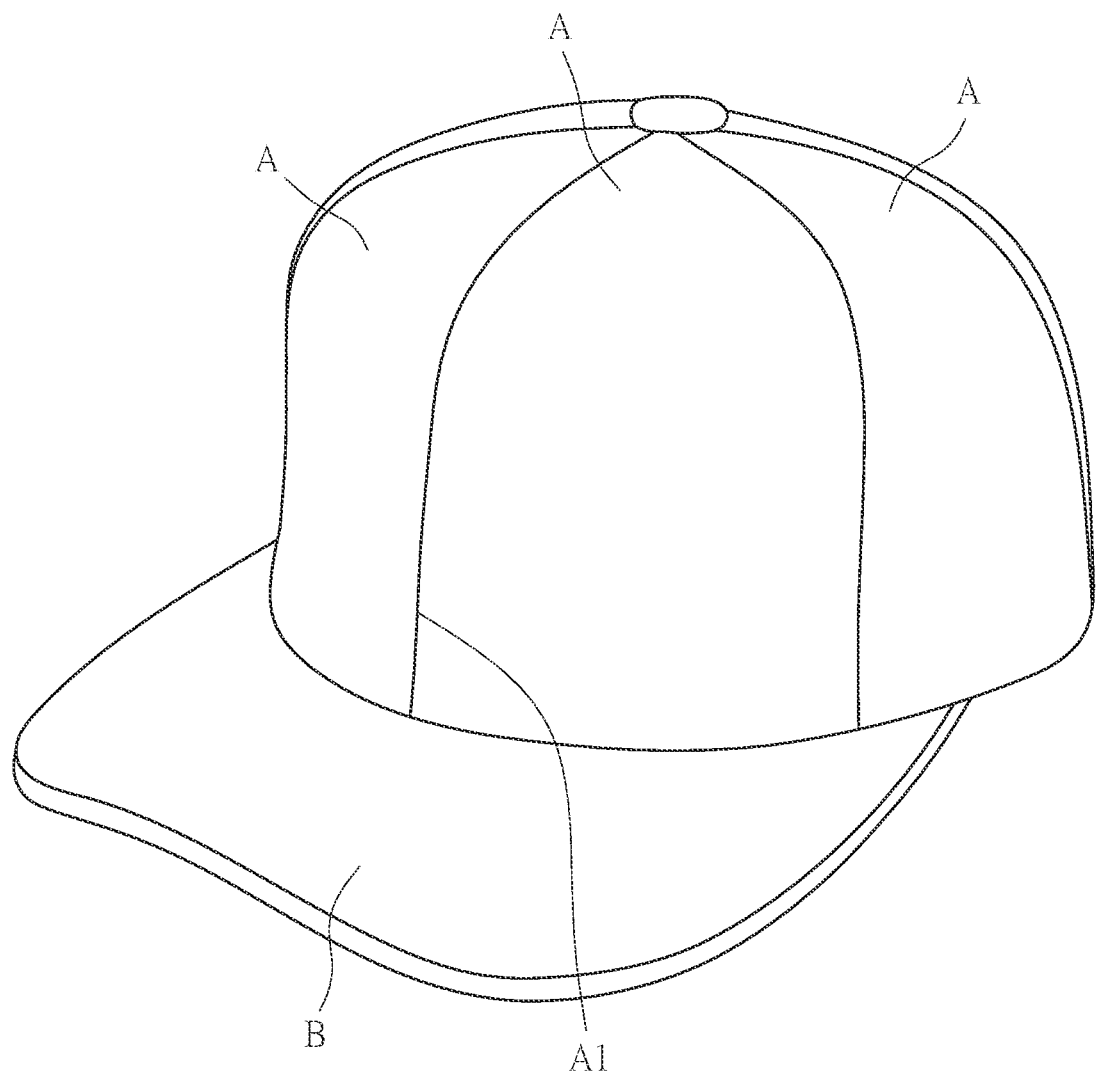
FIG. 8 is a perspective view of a conventional baseball cap.
Figure 9:
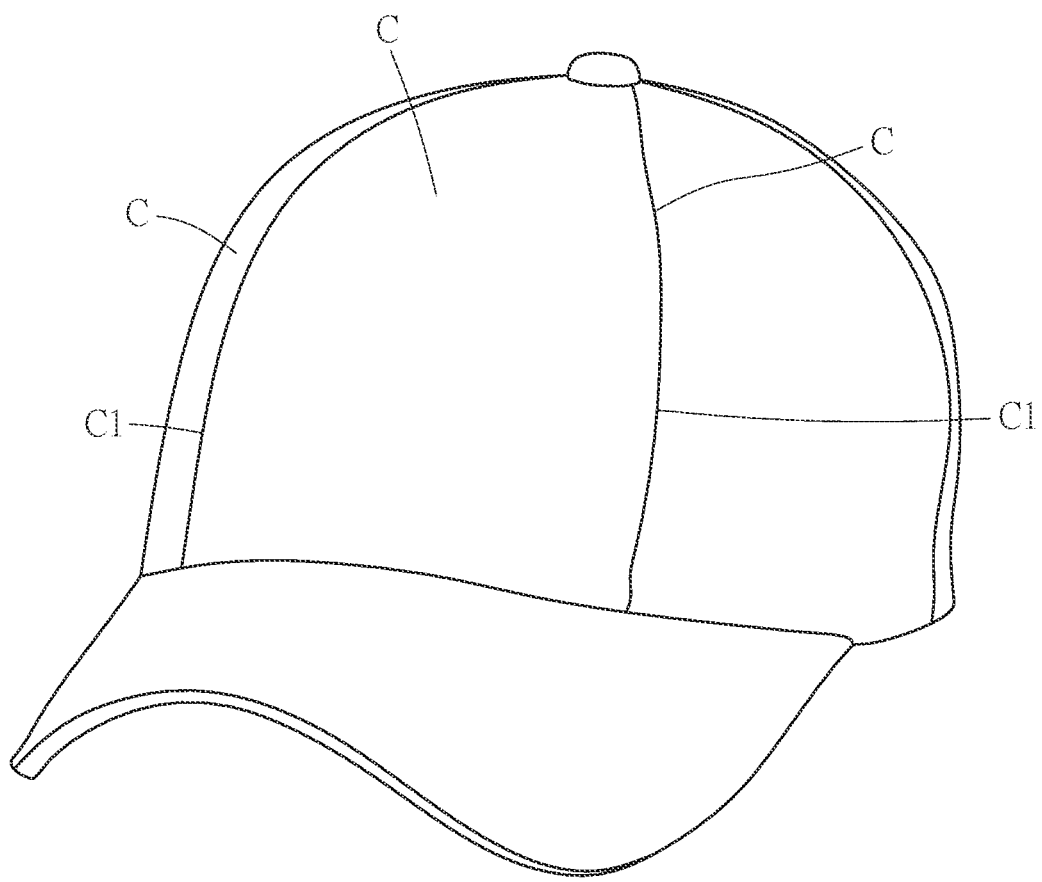
FIG. 9 is a perspective view of another conventional baseball cap.
Figure 10:
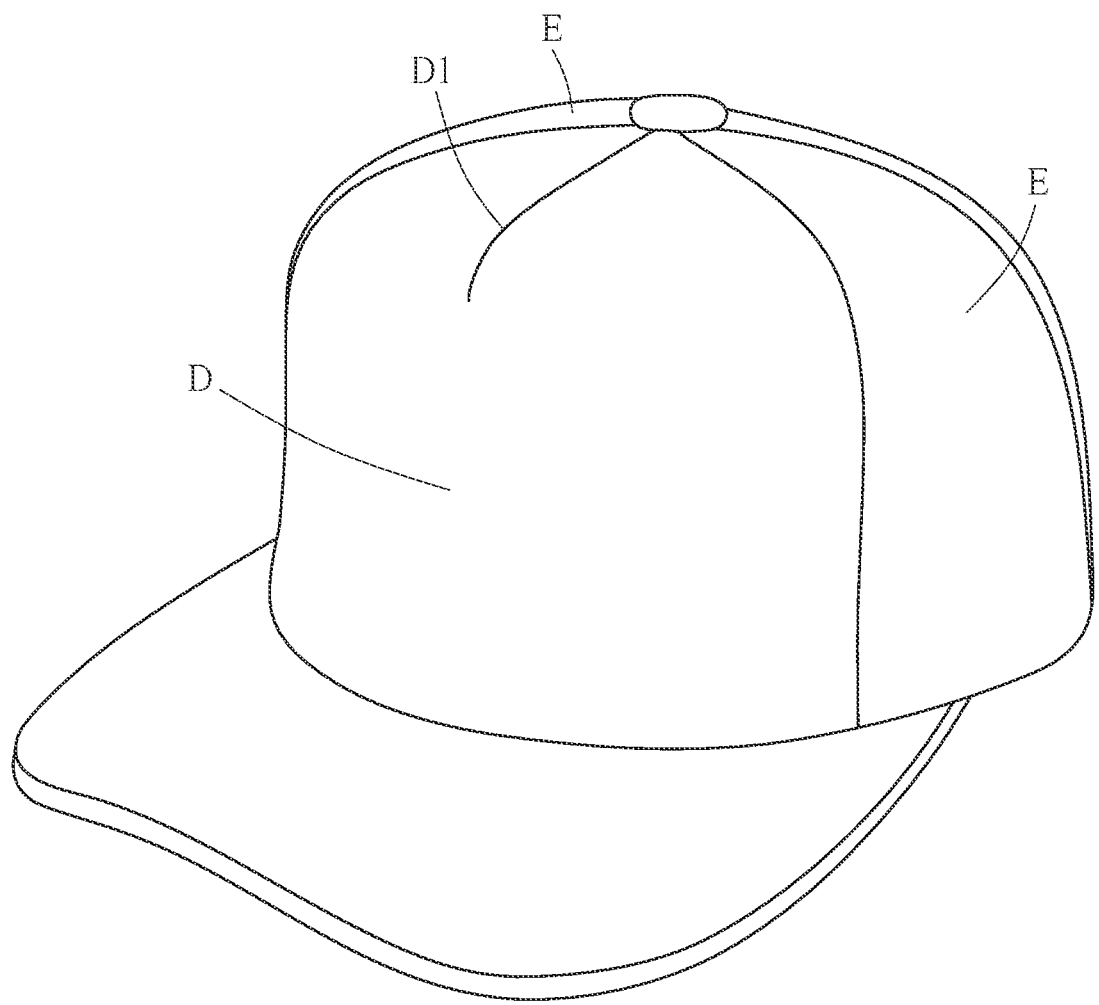
FIG. 10 is a perspective view of yet another conventional baseball cap.

Referring to FIG. 5, the front panel 11 is a moldable panel and includes an integrally formed outer layer of fabric 111, an integrally formed moldable layer 112 adhesively bonded to the outer layer of fabric 111, and an integrally formed layer of buckram 113 adhesively bonded to the moldable layer 112. In addition, the front panel 11 has a curved edge formed by a mold 3. More specifically, the cap is formed by first bonding the outer layer of fabric 111, the moldable layer 112, and the layer of buckram 113 together adhesively to form the front panel 11; then performing a single molding process that involves heating and pressure application through the mold 3 to form the curved edge of the front panel 11, wherein the outer layer of fabric 111, the moldable layer 112, and the layer of buckram 113 may be cut to the shape of the front panel 11 immediately after they are adhesively bonded together or be trimmed after the curved edge of the front panel 11 is formed by the mold 3; connecting the front panel 11 and the side panels 12 to form the crown 1; and connecting the peak 2 to the front panel 11 of the crown 1 to form the cap. It should be pointed out that while the front panel 11 and the side panels 12 in this embodiment are connected by stitching, the side panels 12 may be integrally formed with the outer layer of fabric 111 of the front panel 11 instead. That is to say, the side panels 12 and the outer layer of fabric 111 of the front panel 11 may be made of a single sheet of fabric, before the moldable layer 112 is adhesively bonded to the sheet of fabric at a position corresponding to the front panel 11 (this configuration is not shown in the drawings). As another alternative, the outer layer of fabric 111 of the front panel 11 may be integrally formed with the side panels 12, with the integrally formed moldable layer 112 provided on the front panel 11 and the side panels 12 (this configuration is not shown in the drawings, either). It should be further pointed out that, apart from disposing the moldable layer 112 on the front panel 11 in order to form the protruding curved edge, the present invention allows the moldable layer 112 to be disposed on the front panel 11 and/or the side panels 12 as needed in order to form the curved edge, as shown in FIG. 6, FIG. 6A, and FIG. 7. FIG. 6 shows an embodiment in which the front panel 11 and some of the side panels 12 are each provided with the moldable layer 112, and FIG. 7 shows an embodiment in which the front panel 11 and all the side panels 12 are provided with the moldable layer 112. In FIG. 6A, the moldable panel forms a single side panel 12A, and a top portion of the front panel 11A is formed with a stitched joint 111A in a conventional manner.

The moldable layer 112 may be made of wool, or an EVA material, or PP; the present invention has no limitation in this regard. The moldable layer 112 may be made of any material that can be molded into the desired shape when heated and subjected to pressure. When the moldable layer 112 is made of wool, the mold 3 may work at a molding temperature between 165° C. and 195° C., preferably 180° C. When the moldable layer 112 is made of an EVA material, the mold 3 may work at a molding temperature between 185° C. and 215° C., preferably 200° C. When the moldable layer 112 is made of PP, the mold 3 may work at a molding temperature between 100° C. and 120° C., preferably 110° C. Using a proper molding temperature that suits the material of the moldable layer 112 helps shape the moldable layer 112 effectively so that the moldable layer 112 can effectively support the outer layer of fabric 111 and the layer of buckram 113 to keep the curved edge of the front panel 11 in shape.

In this embodiment, the cap made by the forming method described above is such that once the curved edge of the front panel 11 is formed by the mold 3, the integrally formed outer layer of fabric 111 is supported, and has its shape maintained, by the integrally formed moldable layer 112 and therefore need not be supported by multiple pieces of buckram that are stitched together, as is required in the prior art. In this embodiment, the layer of buckram 113 is adhesively bonded to the moldable layer 112 to enhance the erectness of the front panel 11. Moreover, now that the moldable layer 112 can keep its molded shape, the layer of buckram 113 is integrally formed rather than made by stitching at least two pieces of buckram together. Consequently, none of the outer layer of fabric 111, the moldable layer 112, and the layer of buckram 113 of the front panel 11 has a joint. When making a decoration on the front panel 11 by embroidering or other methods, therefore, the needle or thread used for embroidering will not be broken due an uneven or overly thick joint that is typical in the prior art, and various defects attributable to such joints are prevented to ensure the quality of the decoration, be it made by embroidering or otherwise.

The front panel 11 in the present invention is so designed that the outer layer of fabric 111, the moldable layer 112, and the layer of buckram 113 are adhesively bonded together before a single molding process is performed with the mold 3 at a temperature and pressure that are appropriate to the material of the moldable layer 112. Hence, not only are the plurality of processing steps of the prior art reduced, but also imprecise fabric connection and misalignment between adhesively bonded fabrics are avoided to lower the fraction defective and reduce defective products. In addition, the material of the outer layer of fabric 111 of the front panel 11 in the invention is subject to no limitations and can be chosen arbitrarily according to product requirements. The materials of the moldable layer 112 and of the layer of buckram 113 can be adjusted as well to meet product requirements. Depending on the materials of the outer layer of fabric 111 and of the moldable layer 112, the layer of buckram 113 can also be adjusted flexibly. For example, the layer of buckram 113 may be dispensed with when the molded moldable layer 112 is hard enough to support the curved edge of the front panel 11.

The foregoing description of the illustrated embodiment should be able to enable a full understanding of the operation, use, and effects of the present invention. The embodiment, however, is only a preferred one of the invention and is not intended to be restrictive of the scope of the invention. All simple equivalent changes and modifications made according to the present specification and the appended claims shall fall within the scope of the invention.

What is claimed is:

1. A cap, comprising:
a crown having a front moldable panel and at least one second panel, wherein the front moldable panel and the at least one second panel are connected to one another, wherein the front moldable panel is an integral laminated panel formed from a single pre-cut unit of an outer layer of fabric, a single pre-cut unit of a moldable layer adhesively bonded to the single pre-cut unit of the outer layer of fabric, and a single pre-cut unit of a buckram layer adhesively bonded to the single pre-cut unit of the moldable layer, said single pre-cut units of the outer layer of fabric, moldable layer and buckram layer having a configuration and dimensions substantially similar to one another, wherein said front moldable panel is shaped after lamination with a curved edge formed by a mold; and
a peak connected to the crown.

2. The cap of claim 1, wherein the moldable layer is fabricated from a material selected from a group consisting of wool, an ethylene-vinyl acetate material, and polypropylene.

3. The cap of claim 1, wherein the at least one second panel includes four side panels.

4. The cap of claim 1, wherein the outer layer of fabric of the front moldable panel is integrally formed with the at least one second panel.

5. The cap of claim 4, wherein the pre-cut unit of the moldable layer is adhesively bonded to the at least one second panel.

* * * * *